United States Patent Office 2,911,366
Patented Nov. 3, 1959

2,911,366

DRILLING MUD

Ross M. Hedrick, Dayton, Ohio, and David T. Mowry, Kirkwood, Mo., assignors to Monsanto Chemical Company, St. Louis, Mo., a corporation of Delaware No Drawing. Application April 11, 1957
Serial No. 652,095

16 Claims. (Cl. 252—8.5)

This invention relates to drilling fluids or muds such as are employed in the rotary drilling of oil and gas wells. More particularly, it relates to drilling muds which have improved properties for preventing or improving loss of fluid from the well bore into the surrounding formations.

Drilling of an oil or gas well by the rotary method is performed by rotating a bit attached to the end of a hollow drill pipe, known as a drill stem, which extends downwardly through the well bore. As the drill stem is rotated from the surface, the bit cuts or grinds away the formation into small fragments known as cuttings which must be removed from the hole in order that the drilling may progress. To carry away these cuttings, a fluid commonly referred to as drilling mud is continuously pumped down the drill stem, through channels in the drill bit itself, and then up through the annular space between the drill stem and the walls of the borehole to the surface of the earth. In addition to the primary function of picking up the cuttings produced by the drill bit and carrying them to the surface, the drilling mud serves a number of other purposes. It must lubricate and cool the drill stem and bit; it must apply a hydrostatic pressure to the formation to counterbalance the pressure of any liquids or gases which may be encountered in the various strata penetrated by the drill bit in order to prevent flow of formation fluid into the borehole; and it must form on the walls of the borehole a thin impervious layer or sheath of solid material which serves to reduce loss of water from the borehole to the formation and provides support for the walls to prevent their collapse into the drill hole.

The ability of any given mud to carry out these important functions depends upon certain readily measurable physical properties. Viscosity is an important characteristic. The drilling mud must have a viscosity sufficiently high to permit it to effectively suspend and remove the cuttings from the bottom of the well. On the other hand, the viscosity must at the same time be low enough so that the mud may be readily circulated at the desired rates without requiring excessive pump pressures and/or power consumption. The drilling mud must also be sufficiently thixotropic or have sufficient gel strength to prevent settling of solids from the mud when circulation is stopped but, at the same time, must readily release the cuttings from suspension when the mud is agitated as in the settling pits.

Of prime importance also in drilling muds is the so-called water-loss or wall-building characteristic of the mud. A good mud deposits a thin, tough impermeable filter cake which prevents much fluid from being lost to the formation by pressure filtration. When large amounts of water filter from the mud into the formation surrounding the borehole, the solid contents of the mud build up a thick filter cake on the walls of the hole. If this filter cake becomes thick enough, it may restrict the size of the annular passage, or slough off and cause jamming of the bit. In addition, other difficulties are caused by high water loss. Fluid lost to the formation may cause hydration of formation shales resulting in swelling or heaving of the formation. Water lost to the formation may also result in plugging or "water-blocking" of oil-bearing sands.

Considerable work has been done in an attempt to develop additives for drilling muds to impart desirable properties of viscosity, gel strength, and filtration characteristics thereto. This is particularly true with regard to filtration or water-loss. In order to prevent or control such loss, it has become common practice to add some chemical agent to the mud. A wide variety of chemicals have been employed among which may be mentioned, for example, sulfonated rubber, polyalkylaryl sulfonates, starch and starch derivatives, various celluloses and the like. While such additives function effectively as water-loss reducers, it has been found that they themselves frequently impart other undesirable properties to the drilling muds in which they are incorporated. Certain of them, such as hydrolyzed polyacrylonitrile, for example, increase viscosity beyond tolerable limits and adversely affect gel strength; others, such as starch and starch derivatives, are objectionable because they are subject to bacterial decomposition.

Among the better additives are those disclosed in U.S. Patent 2,718,497 issued to Oldham et al. These patentees teach generally the use in aqueous drilling fluids of polymers and copolymers having long chains with carboxyl groups distributed along the chains. As one example of a suitable polymer they mention a copolymer of isobutylene and maleic anhydride. The copolymer described is in the form of its alkali metal salt. It has now been discovered that the half-amide, half-ammonium salt form of copolymers of olefins and maleic anhydride are decidedly superior to any of the other derivatives of these copolymers such as the free acid form, the alkali metal salts, the ammonium salts, and the like. By the use of the half-amide, half-ammonium form of the olefin-maleic anhydride copolymers not only can better filtration rates be obtained but optimum filtration rates are easier to achieve since the effect of the ammoniated form of the copolymer of the invention on viscosity is less marked than is that of the other forms. This remarkable improvement is indeed a surprising development since the slight change in structure between these copolymers and those of the prior art would not ordinarily be expected to be sufficiently significant to bring about these advantages.

It is an object, therefore, of the present invention, to provide novel effective and improved additives for drilling muds which may be employed for the reduction of loss of water therefrom. A second object of the invention is to provide a method for controlling the filtration rate of aqueous drilling muds without adversely affecting either the viscosity of the mud or its ability to maintain solids in suspension.

It is another object of the invention to provide an improved water-base drilling mud which has little tendency to lose water by filtration and which is useful in rotary drilling of bore holes into subsurface formations.

A still further object of the invention is to provide an improved method of drilling oil or gas wells in which the water-base drilling mud herein described is employed.

An additional object is to provide a drilling mud which is immune to the deleterious thickening effect of salt.

Other objects and advantages will become apparent to those skilled in the art from the following description and appended claims.

These objects may be accomplished according to the present invention by incorporating in the water-base drilling fluid a sufficient amount of a high-molecular-weight copolymer of an olefin and maleic anhydride in the form of its half-amide, half-ammonium salt to reduce the tendency of said drilling mud to lose water by filtration. The composition of the present invention may be described briefly as a mixture comprising finely divided solid material, an aqueous vehicle in which the solid material is dispersed or suspended, and a sufficient amount of a high-molecular-weight copolymer of an olefin and maleic anhydride in its half-amide, half-ammonium salt form to reduce the loss of water from the mixture by filtration. By a "high-molecular-weight copolymer" is meant a copolymer of an olefin and maleic anhydride whose 1% solution in dimethylformamide has a specific viscosity above a value of 0.7 and preferably has a value in the range from about 0.7 to about 2.5 at 25° C. Wherever in this specification or claims specific viscosity is mentioned, it is to be understood that this is determined at 25° C. on a 1% solution (by weight) of the anhydride form of the copolymer in dimethylformamide.

The finely divided solid material of the invention may, of course, be any finely divided solid which is capable of being dispersed or suspended in an aqueous liquid vehicle. Ordinarily, such material will include hydratable clay or colloidal clay bodies such as Wyoming bentonite, commercial medium-yield drilling clays mined in various parts of the country such as in Texas, Tennessee and Louisiana, and those produced when clayey subsurface formations are drilled. Weighting materials added to increase specific gravity such as barytes, iron oxide, and the like may also be included.

The aqueous medium may be fresh water such as is obtained from wells or streams; it may be salt water from the sea or from wells; or, it may even include oil-in-water emulsions, i.e., water which has become contaminated in some way with small quantities of oil, or to which such oil has been added to gain some desired advantage.

It is contemplated that the drilling muds of the invention may also contain other additives besides the copolymers of olefin and maleic anhydride of the invention. Materials such as caustic, quebracho, lime and the like may be added to the drilling mud at the surface while other materials such as gypsum, shale and the like may be encountered in subsurface formations during drilling operations.

The quantities of the olefin-maleic anhydride copolymers to be employed in the drilling mud of the invention will vary with circumstances over a reasonably wide range and the amount employed in a specific suspension or dispersion will depend on these circumstances and the characteristics of the drilling fluid treated. Ordinarily, satisfactory results with regard to water loss reduction will be obtained with quantities ranging between one and four pounds per 42-gallon barrel of drilling mud. For optimum reduction in filtration rate with certain drilling muds, however, quantities up to 6 lb. per 42-gallon barrel may be required. On the other hand, in some cases where, for example, only small improvement in filtration rate is desired, as little as 0.5 lb. of the additive per barrel of mud will produce the desired effect. The exact amount to be added, as previously pointed out, depends upon the original character of the mud and on the properties desired. This can be determined, as is customary in the field by simple tests at the time the addition is made.

When employed in accordance with the invention, the copolymers may be added directly to the drilling mud as a dry powder, as a slurry suspended in a suitable liquid, or as a solution in water or some other suitable solvent, and they may be incorporated therein at any convenient point in the mud circulation system. It may be desirable to employ a mixing device such as a cone and jet mixer or the equivalent for incorporating the additive in the mud.

The olefin-maleic anhydride copolymers useful in the invention are readily prepared by techniques well known in the art such as, for example, the methods described in U.S. Patent 2,378,629. Generally, the copolymers are prepared by reacting a mono-olefin having a terminal methylene group with maleic anhydride in the presence of a peroxide catalyst in an aliphatic or aromatic hydrocarbon which is a solvent for the monomers but is a non-solvent for the copolymer formed. Olefins containing from one to eight carbon atoms are preferred. Those which may be employed include, for example, ethylene, propylene, isobutylene, diisobutylene, 1-butene, 1-pentene, 1-hexene, 3-methyl-butene-1 and the like. Suitable solvents include benzene, toluene, xylene, chlorinated benzene, hexane, acetone, ethylene dichloride, and the like. While benzoyl peroxide is the preferred catalyst, other peroxides such as acetyl peroxide, butyryl peroxide, ditertiary-butyl peroxide, lauroyl peroxide and the like are all satisfactory since they are soluble in organic solvents. The copolymer contains substantially equimolar quantities of the olefin residue and the maleic anhydride residue. The properties of the polymer such as molecular weight, for example, may be regulated by proper choice of the catalyst and control of one or more of the variables such as ratio of reactants, temperature, and catalyst concentration. The product is obtained in solid form and is easily recovered by filtration, centrifugation or the like. Removal of any residual or adherent solvent may be effected by evaporation using moderate heating.

The reaction of these heteropolymers with ammonia yields a half-amide, half-ammonium-salt-containing group attached to the maleic anhydride residue. The additives of the invention may, therefore, be viewed as copolymers comprising repeating units having the structure

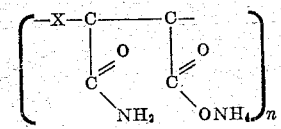

wherein X is the residue of the olefin and $n$ is the number of repeating units in the polymer. These half-amide, half-ammonium salts of the copolymers may be readily prepared by contacting the particles of the solid copolymers with ammonia gas at ordinary or elevated temperatures. Some moisture may be present if desired but the use of dry ammonia gas is preferred since the product is then obtained in a dry finely divided form which is water-soluble and suitable for use without further treatment. Heat is liberated in the reaction and it is desirable, therefore, to provide some means for dissipating it so that the product will not be affected by exposure to excessively high temperatures. One effective means for controlling the heat of reaction consists of suspending the solid polymer in an inert organic liquid such as benzene and bubbling ammonia through the slurry.

The following examples are presented to particularly illustrate the invention but they are not intended to limit it in any manner except as it is limited in the appended claims.

EXAMPLE I

A stock of a standard drilling mud was prepared containing 35% solids suspended in water. On a dry basis, the solids consisted of 10 parts by weight of Tennessee Ball clay, one part by weight of bentonite, and 4 parts by weight of Dixie Bond clay. The "break-over" from sodium-base to lime-base fluid was achieved by adding 5 g. of hydrated lime, 3 g. of "Kembreak" or quebracho and 1 g. of NaOH for each 350 ml. of the suspension. To two different samples of this mud there were added varying amounts of two isobutylene-maleic anhydride copolymers, one in the form of the disodium salt of the copolymer designated as Sample No. 1 and the other in the form of its half-amide, half-ammonium salt designated as Sample No. 2. Specific viscosities of these copolymers were both above 0.7. The samples were then tested to determine their filtration rate and viscosity by means of the standard procedures given in "Recommended Practice for Standard Field Procedure for Testing Drilling Fluids" of the American Petroleum Institute, third edition, May 1950. Results are tabulated in Table I.

Table I

| Sample No. | Concentration (lb./bbl.) | Filtration Rate (cc. in 30-min. API) | Viscosity, 600 r.p.m. Stormer (cp.) |
|---|---|---|---|
| Blank | 0 | 26.5 | 9.5. |
| 1 | 0.5 | 59.5 | 85.5. |
| 1 | 1.0 | 63.5 | Plastic.[1] |
| 1 | 2.0 | 40.5 | Do.[1] |
| 1 | 4.0 | 7.5 | Do.[1] |
| Blank | 0 | 27 | 9.5. |
| 2 | 0.5 | 15 | 14.5. |
| 2 | 1.0 | 8 | 16. |
| 2 | 2.0 | 5 | 34.5. |
| 2 | 4.0 | 3 | 63.5. |

[1] Above 150 centipoises or not measurable.

It will be seen from these data that only one lb./bbl. of the half-amide, half-ammonium salt form of the isobutylene-maleic anhydride copolymer is required to reduce water loss from 27 to 8 cc. whereas 4 lb. per bbl. of the sodium salt form of the same copolymer must be added to the mud to get a comparable filtration rate. In addition, with the reduction in water-loss to the level of 8 cc. obtained with the sodium salt form of the copolymer there is an accompanying undesirable effect on viscosity requiring the use of a thinner in addition to the water-loss reducer whereas such is not the case when the half-amide, half-ammonium salt form is used. In fact, up to 4 lb. per barrel may be used of this latter additive without any accompanying adverse effect on viscosity. These same considerations hold true generally for the two forms of the copolymer in question when employed in gypsum-base muds and in sea-water muds to secure filtration rates of the order of 8 cc. This is readily seen from Table II where the results of the tests of Example I repeated with these types of muds are presented. Gypsum-base mud is made from the same basic clay blend as the lime-base mud except that 3.5 g. of anhydrite ($CaSO_4 \cdot 2H_2O$) is added for each 350 ml. of the suspension instead of the hydrated lime. Sea-water mud is that made by suspending 35% solids, in this case, the same clay blend used in the other muds, in sea-water obtained from the Gulf of Mexico.

Table II

| Mud Type | Additive Sample No. | Amt. of Additive (lb./bbl.) | Filtration Rate (cc. in 30-min. API) | Viscosity, 600 r.p.m. Stormer (cp.) |
|---|---|---|---|---|
| Gypsum-base | Blank | 0 | 22 | 21. |
| Do | 1 | 0.5 | 29.5 | Plastic.[1] |
| Do | 1 | 1.0 | 43(29') | Do.[1] |
| Do | 1 | 2.0 | 27(29') | Do.[1] |
| Do | 1 | 4.0 | 7 | Do.[1] |
| Do | Blank | 0 | 29.5 | 17.5. |
| Do | 2 | 0.5 | 22 | 38.5. |
| Do | 2 | 1.0 | 14 | 59. |
| Do | 2 | 2.0 | 7.5 | 109.5. |
| Sea-Water | Blank | 0.0 | 51.5 | 43.5. |
| Do | 1 | 0.5 | 35 | 27.5. |
| Do | 1 | 1.0 | 25 | 17.5. |
| Do | 1 | 2.0 | 20.5 | 19.5. |
| Do | 1 | 4.0 | 13.5 | 20.. |
| Do | 2 | 0.5 | 54 | 78. |
| Do | 2 | 1.0 | 26 | 46. |
| Do | 2 | 2.0 | 10 | 21.5. |
| Do | 2 | 4.0 | 7 | 32.5. |

[1] Above 150 centipoises or not measurable.

EXAMPLE II

Varying quantities of copolymers of propylene and maleic anhydride having different specific viscosities all above 0.70 were added to samples of the standard lime-base drilling mud and the resulting muds were tested as described in Example I. Copolymers of a given viscosity were all tested in the form of the half-amide, half-ammonium salt designated as APMA and in at least one other of the following forms: (1) the free acid form, designated as PMA; (2) the sodium salt form, designated as NaPMA; and the ammonium salt form, designated as $NH_4$ PMA. Results are tabulated in Table III. The definite superiority of the half-amide, half-ammonium salt form over the other forms of these copolymers is clearly demonstrated by these data.

Table III

| Copolymer Additive | $\eta_{sp}$ [1] | Amt. of Additive (lb./bbl.) | Filtration Rate (cc. in 30-min. API) | Stormer Viscosity, 600 r.p.m. (cp.) |
|---|---|---|---|---|
| APMA | 0.86 | 1.0 | 8 | 37 |
| APMA | 0.86 | 2.0 | 9.5 | 46 |
| APMA | 0.86 | 3.0 | 7 | 53 |
| PMA | 0.86 | 2.0 | 35 | 76 |
| PMA | 0.86 | 3.0 | 31 | 64 |
| NaPMA | 0.86 | 1.0 | 30 | 117 |
| NaPMA | 0.86 | 2.0 | 22 | 90 |
| NaPMA | 0.86 | 3.0 | 16 | 80 |
| $NH_4$PMA | 0.86 | 1.0 | 33 | 120 |
| $NH_4$PMA | 0.86 | 2.0 | 23 | 82 |
| $NH_4$PMA | 0.86 | 3.0 | 16 | 80 |
| APMA | 1.48 | 2.0 | 8 | 57 |
| PMA | 1.48 | 2.0 | 37 | 125 |
| APMA | 1.89 | 2.0 | 9 | 127 |
| APMA | 1.89 | 3.0 | 7 | 152 |
| PMA | 1.89 | 2.0 | 37 | 140 |
| PMA | 1.89 | 3.0 | 37 | 274 |

[1] Specific viscosity.

EXAMPLE III

As in Examples I and II, varying quantities of ethylene-maleic anhydride copolymers having different specific viscosities were added to samples of the lime-base, sodium-base, and sea-water muds. Copolymers of comparable viscosities were tested in the form of the half-amide, half-ammonium salt designated as AEMA and the sodium salt designated as NaEMA. The treated muds were tested by the standard procedures mentioned in Example I except that the flow behavior of the mud in this instance was determined with a multispeed Fann V–G viscosimeter. A description of this instrument, the plastic flow properties it measures and their significance in drilling mud control may be found in Melrose and Lilienthal, J. Pet. Tech., T.P. 3061, p. 159 (1951). In general, field control of mud viscosity properties is directed toward the maintenance of a constant and preferably a low resistance to flow. The measurement of this resistance to flow with the Fann Viscosimeter is the yield value which is actually a measurement of the interparticle forces in the mud. Chemical treatment of the mud directly affects the yield value, hence, the effectiveness of a particular chemical additive as a thinner or in reducing resistance to flow is directly measurable by means of the yield value. Results of the tests are presented in Table IV.

Table IV

| Mud Type | Copolymer Added | ηsp[1] | Amt. of Additive (lb./bbl.) | Filtration Rate (cc. in 30-min. API) | Gel Strength 0-Min. (g.) | Gel Strength 10-Min. (g.) | Viscosity Fann (cp.) | Viscosity Plastic (cp.) | Viscosity Yield Pt. (lb./100 ft.²) |
|---|---|---|---|---|---|---|---|---|---|
| Lime-base | None | ------ | None | 37 | 0 | 0 | 6 | 5 | 2 |
| Do | NaEMA | 1.260 | 0.5 | 40 | 5 | 40 | 11.5 | 8 | 7 |
| Do | NaEMA | 1.260 | 1.0 | 48.5 | 15 | 80 | 18.5 | 11 | 15 |
| Do | NaEMA | 1.260 | 2.0 | 49.0 | 20 | 80 | 22.5 | 14 | 17 |
| Do | NaEMA | 1.260 | 4.0 | 4.5 | 0 | 0 | 11.5 | 12 | 0 |
| Do | NaEMA | 1.260 | 6.0 | 3 | 0 | 0 | 21.5 | 20 | 3 |
| Do | None | ------ | None | 24.5 | 5 | 20 | 14 | 12 | 4 |
| Do | AEMA | 1.18 | 0.5 | 40 | 50 | 150 | 46.5 | 30 | 33 |
| Do | AEMA | 1.18 | 1.0 | 29.5 | 20 | 240 | 22 | 16 | 12 |
| Do | AEMA | 1.18 | 2.0 | 8.5 | 5 | 20 | 26 | 23 | 6 |
| Do | AEMA | 1.18 | 4.0 | 4.5 | 15 | 70 | 63 | 54 | 18 |
| Do | AEMA | 1.18 | 6.0 | 4 | 0 | 20 | 78 | 66 | 24 |
| Sea-Water | None | ------ | None | 63.5 | 100 | 100 | 52 | 7 | 90 |
| Do | NaEMA | 1.260 | 0.5 | 70 | 50 | 70 | 38 | 16 | 44 |
| Do | NaEMA | 1.260 | 1.0 | 61 | 70 | 100 | 28 | 14 | 28 |
| Do | NaEMA | 1.260 | 2.0 | 27 | 0 | 0 | 12 | 12 | 0 |
| Do | NaEMA | 1.260 | 4.0 | 12 | 0 | 0 | 13 | 13 | 0 |
| Do | NaEMA | 1.260 | 6.0 | 4.5 | 0 | 0 | 16 | 15 | 2 |
| Do | None | ------ | None | 41 | 220 | 220 | 90 | 20 | 140 |
| Do | AEMA | 1.18 | 0.5 | 22 | 130 | 150 | 63.5 | 10 | 107 |
| Do | AEMA | 1.18 | 1.0 | 14 | 50 | 200 | 50 | 17 | 66 |
| Do | AEMA | 1.18 | 2.0 | 7.5 | 20 | 150 | 45 | 34 | 22 |
| Do | AEMA | 1.18 | 4.0 | 5 | 0 | 20 | 41 | 35 | 12 |
| Do | AEMA | 1.18 | 6.0 | 3 | 5 | 30 | 59.5 | 49 | 21 |

[1] Specific viscosity.

Consideration of the foregoing data will make it apparent that there are provided by this invention some particularly valuable additives for controlling water-loss in drilling muds. The copolymers of the invention when incorporated in drilling muds of various types promote the formation of a thin filter cake on the walls of the borehole, said filter cake being substantially impervious to water and naturally occurring liquids with the result that the well does not become contaminated by such liquids and the porous formations through which the drill passes do not absorb water from the mud. This in turn aids in maintaining the quality of the mud preventing swelling and heaving of the earth formation. In addition, the addtives of the invention are not subject to bacterial decomposition, have excellent heat stability and have no accompanying adverse effects on mud viscosity and gel strength.

This application is a continuation-in-part of our co-pending application Serial No. 381,735, filed September 22, 1953, now abandoned, which application was a continuation-in-part of our application Serial No. 300,354, filed July 22, 1952, now abandoned.

What is claimed is:

1. A drilling fluid comprising an aqueous suspension of finely divided solid inorganic materials which form a filter cake on the wall of a well and a copolymer of an olefin containing from 1 to 8 carbon atoms and maleic anhydride having a specific viscosity above 0.70, said copolymer being present in the form of its half-amide, half-ammonium salt and in an amount sufficient to reduce the water loss due to filtration through said cake but insufficient to increase the viscosity of said drilling fluid such that it becomes uncirculatable.

2. A drilling fluid comprising an aqueous suspension of finely divided solid inorganic materials which form a filter cake on the wall of a well and a copolymer of an olefin containing from 1 to 8 carbon atoms and maleic anhydride having a specific viscosity in the range from about 0.70 to about 2.5, said copolymer being present in the form of its half-amide, half-ammonium salt and in an amount sufficient to reduce the water loss due to filtration through said cake but insufficient to increase the viscosity of said drilling fluid such that it becomes uncirculatable.

3. A drilling fluid comprising an aqueous suspension of finely divided solid inorganic materials which form a filter cake on the wall of a well and a copolymer of isobutylene and maleic anhydride having a specific viscosity above 0.70, said copolymer being present in the form of its half-amide, half-ammonium salt, and in an amount sufficient to reduce the water loss due to filtration through said cake but insufficient to increase the viscosity of said drilling fluid such that it becomes uncirculatable.

4. A drilling fluid comprising an aqueous suspension of finely divided solid inorganic materials which form a filter cake on the wall of a well and a copolymer of isobutylene and maleic anhydride having a specific viscosity in the range from about 0.70 to about 2.5, said copolymer being present in the form of its half-amide, half-ammonium salt and in an amount sufficient to reduce the water loss due to filtration through said cake but insufficient to increase the viscosity of said drilling fluid such that it becomes uncirculatable.

5. A drilling fluid comprising an aqueous suspension of finely divided solid inorganic materials which form a filter cake on the wall of a well and a copolymer of ethylene and maleic anhydride having a specific viscosity above 0.70, said copolymer being present in the form of its half-amide, half-ammonium salt and in an amount sufficient to reduce the water loss due to filtration through said cake but insufficient to increase the viscosity of said drilling fluid such that it becomes uncirculatable.

6. A drilling fluid comprising an aqueous suspension of finely divided solid inorganic materials which form a filter cake on the wall of a well and a copolymer of ethylene and maleic anhydride having a specific viscosity in the range from about 0.70 to about 2.5, said copolymer being present in the form of its half-amide, half-ammonium salt and in an amount sufficient to reduce the water loss due to filtration through said cake but insufficient to increase the viscosity of said drilling fluid such that it becomes uncirculatable.

7. A drilling fluid comprising an aqueous suspension of finely divided solid inorganic materials which form a filter cake on the wall of a well and a copolymer of propylene and maleic anhydride having a specific viscosity above 0.70, said copolymer being present in the form of its half-amide, half-ammonium salt and in an amount sufficient to reduce the water loss due to filtration through said cake but insufficient to increase the viscosity of said drilling fluid such that it becomes uncirculatable.

8. A drilling fluid comprising an aqueous suspension of finely divided solid inorganic materials which form a filter cake on the wall of a well and a copolymer of propylene and maleic anhydride having a specific viscosity in the range from about 0.7 to about 2.5, said copolymer being present in the form of its half-amide, half-ammonium salt and in an amount sufficient to reduce the water loss due to filtration through said cake but insufficient to increase the viscosity of said drilling fluid such that it becomes uncirculatable.

9. In the process for drilling a well with well-drilling tools wherein there is circulated in the well a water-base drilling mud containing finely divided solid inorganic materials suspended in sufficient water to render the same circulatable, the method of forming a filter cake on the wall of said well to decrease the loss of fluid from said drilling mud contained therein into surrounding earthen formations which comprises admixing with said drilling mud a copolymer of an olefin containing from 1 to 8 carbon atoms and maleic anhydride having a specific viscosity above a value of 0.70, said copolymer being in the form of its half-amide, half-ammonium salt and in an amount sufficient to lower the fluid loss through said filter cake but insufficient to increase viscosity of said mud to such an extent as to render it uncirculatable, and contacting said wall of said well with the resulting drilling fluid to form said filter cake thereon.

10. In the process for drilling a well with well-drilling tools wherein there is circulated in the well a water-base drilling mud containing finely divided solid inorganic materials suspended in sufficient water to render the same circulatable, the method of forming a filter cake on the wall of said well to decrease the loss of fluid from said drilling mud contained therein into surrounding earthen formations which comprises admixing with the said drilling mud a coplymer of an olefin containing from 1 to 8 carbon atoms and maleic anhydride having a specific viscosity in the range from about 0.70 to about 2.5, said copolymer being in the form of its half-amide, half-ammonium salt and in an amount sufficient to lower the fluid loss through said filter cake but insufficient to increase viscosity of said mud to such an extent as to render it uncirculatable, and contacting said wall of said well with the resulting drilling fluid to form said filter cake thereon.

11. In the process for drilling a well with well-drilling tools wherein there is circulated in the well a water-base drilling mud containing finely divided solid inorganic materials suspended in sufficient water to render the same circulatable, the method of forming a filter cake on the wall of said well to decrease the loss of fluid from said drilling mud contained therein into surrounding earthen formations which comprises admixing with the said drilling mud a copolymer of isobutylene and maleic anhydride having a specific viscosity above a value of 0.70, said copolymer being in the form of its half-amide, half-ammonium salt and in an amount sufficient to lower the fluid loss through said filter cake but insufficient to increase viscosity of said mud to such an extent as to render it uncirculatable, and contacting said wall of said well with the resulting drilling fluid to form said filter cake thereon.

12. In the process for drilling a well with well-drilling tools wherein there is circulated in the well a water-base drilling mud containing finely divided solid inorganic materials suspended in sufficient water to render the same circulatable, the method of forming a filter cake on the wall of said well to decrease the loss of fluid from said drilling mud contained therein into surrounding earthen formations which comprises admixing with the said drilling mud a copolymer of isobutylene and maleic anhydride having a specific viscosity in the range from about 0.70 to about 2.5, said copolymer being in the form of its half-amide, half-ammonium salt and in an amount sufficient to lower the fluid loss through said filter cake but insufficient to increase viscosity of said mud to such an extent as to render it uncirculatable, and contacting said wall of said well with the resulting drilling fluid to form said filter cake thereon.

13. In the process for drilling a well with well-drilling tools wherein there is circulated in the well a water-base drilling mud containing finely divided solid inorganic materials suspended in sufficient water to render the same circulatable, the method of forming a filter cake on the wall of said well to decrease the loss of fluid from said drilling mud contained therein into surrounding earthen formations which comprises admixing with said drilling mud a copolymer of ethylene and maleic anhydride having a specific viscosity above a value of 0.70, said copolymer being in the form of its half-amide, half-ammonium salt and in an amount sufficient to lower the fluid loss through said filter cake but insufficient to increase viscosity of said mud to such an extent as to render it uncirculatable, and contacting said wall of said well with the resulting drilling fluid to form said filter cake thereon.

14. In the process for drilling a well with well-drilling tools wherein there is circulated in the well a water-base drilling mud containing finely divided solid inorganic materials suspended in sufficient water to render the same circulatable, the method of forming a filter cake on the wall of said well to decrease the loss of fluid from said drilling mud contained therein into surrounding earthen formations which comprises admixing with the said drilling mud a copolymer of ethylene and maleic anhydride having a specific viscosity in the range from about 0.70 to about 2.5, said copolymer being in the form of its half-amide, half-ammonium salt and in an amount sufficient to lower the fluid loss through said filter cake but insufficient to increase viscosity of said mud to such an extent as to render it uncirculatable, and contacting said wall of said well with the resulting drilling fluid to form said filter cake thereon.

15. In the process for drilling a well with well-drilling tools wherein there is circulated in the well a water-base drilling mud containing finely divided solid inorganic materials suspended in sufficient water to render the same circulatable, the method of forming a filter cake on the wall of said well to decrease the loss of fluid from said drilling mud contained therein into surrounding earthen formations which comprises admixing with said drilling mud a copolymer of propylene and maleic anhydride having a specific viscosity above a value of 0.70, said copolymer being in the form of its half-amide, half-ammonium salt and in an amount sufficient to lower the fluid loss through said filter cake but insufficient to increase viscosity of said mud to such an extent as to render it uncirculatable, and contacting said wall of said well with the resulting drilling fluid to form said filter cake thereon.

16. In the process for drilling a well with well-drilling tools wherein there is circulated in the well a water-base drilling mud containing finely divided solid inorganic materials suspended in sufficient water to render the same circulatable, the method of forming a filter cake on the wall of said well to decrease the loss of fluid from said drilling mud contained therein into surrounding earthen formations which comprises admixing with the said drilling mud a copolymer of propylene and maleic anhydride having a specific viscosity in the range from about 0.70 to about 2.5, said copolymer being in the form of its half-amide, half-ammonium salt and in an amount sufficient to lower the fluid loss through said filter cake but insufficient to increase viscosity of said mud to such an extent as to render it uncirculatable, and contacting said wall of said well with the resulting drilling fluid to form said filter cake thereon.

References Cited in the file of this patent

UNITED STATES PATENTS 2,718,497    Oldham et al.   ---------- Sept. 20, 1955